United States Patent Office 2,901,490
Patented Aug. 25, 1959

2,901,490

REGENERATION OF DEGRADED ANTHRAQUINONE WORKING SOLUTIONS FOR THE PRODUCTION OF HYDROGEN PEROXIDE

Jerome W. Sprauer, Wilmington, Del., assignor to E. I. du Pont de Nemours and Company, Wilmington, Del., a corporation of Delaware No Drawing. Application January 29, 1957
Serial No. 636,868

12 Claims. (Cl. 260—369)

This invention relates to the production of hydrogen peroxide in processes involving the alternate catalytic hydrogenation of an anthraquinone and oxygenation of the resulting anthrahydroquinone to regenerate the anthraquinone which is recycled after separating the hydrogen peroxide formed simultaneously therewith. More particularly, it relates to a method for regenerating the hydrogen peroxide synthesizing capacity of a working solution which has become degraded, i.e., its peroxide synthesizing capacity has become substantially reduced, through use in such a process.

In processes of the above type, the working solution is a solution of a working intermediate in a suitable solvent. The intermediate is usually a substituted anthraquinone, such as the aryl and the alkyl substituted anthraquinones. The alkyl substituted anthraquinones, such as the 2-methyl, 2-ethyl, 2-isopropyl and 2-t-butyl compounds, are generally regarded as preferred working intermediates. The corresponding tetrahydro compounds, such as 2-ethyltetrahydroanthraquinone and 2-t-butyltetrahydroanthraquinone, are also usable as intermediates, as are also mixtures thereof with their parent compounds, such as a mixture of 2-t-butylanthraquinone and 2-t-butyltetrahydroanthraquinone. Accordingly, the term "anthraquinone" is used herein to comprehend such anthraquinones, the corresponding tetrahydroanthraquinones and mixture of such compounds.

Continued use of a working solution in such a process eventually results in substantial degradation of the working intermediate with consequent decrease in the peroxide synthesizing capacity of the solution. This is because in each cycle of operation a small amount of the working intermediate is converted to inert anthraquinone degradation products having no peroxide synthesizing value. As the cyclic operation is continued, the concentration in the working solution of such degradation products increases progressively while the concentration of materials having peroxide synthesizing value decreases progressively. Unless additional working intermediate is added or the inert degradation products can be reconverted into effective working intermediate, continuous use of the working solution eventually so reduces its peroxide synthesizing capacity as to render its further use uneconomic.

It is an object of the invention to provide a method for regenerating the peroxide synthesizing capacity of working solutions which have become degraded through use in processes of the above type. A further object is a method of converting inert anthraquinone degradation products formed in such peroxide synthesis processes to materials which function as peroxide synthesizing materials. Still further objects will be apparent from the following description.

The objects of the invention are accomplished by subjecting a solution of the above-mentioned inert anthraquinone degradation products to the reducing action of zinc or magnesium and an acid. The acid used should be one which is miscible with the solution of the quinone degradation products and which, together with the metal, will reduce the anthraquinone intermediate to the anthrahydroquinone.

The term "effective anthraquinone concentration" is used herein to mean the sum of the concentrations of all anthraquinones present in a working solution. A working solution prepared initially using an anthraquinone such as 2-t-butylanthraquinone will usually contain a substantial amount of the corresponding tetrahydro compound after extended use of the solution. Since both of such compounds function as peroxide producing intermediates, the concentrations of both are included in determining the "effective anthraquinone concentration" of a working solution.

The effective anthraquinone concentration of a working solution can be readily determined at any time by hydrogenating an aliquot of the oxidized solution (free of hydrogen peroxide) in the presence of a hydrogenation catalyst such as metallic palladium on activated alumina at one atmosphere hydrogen pressure until all anthraquinones (including terahydroanthraquinones) are completely converted to the anthrahydroquinones. The catalyst is then completely separated from the solution, and the latter is reacted with oxygen until all anthrahydroquinones (including tetrahydroanthrahydroquinones) present are completely converted to anthraquinones and $H_2O_2$, and the amount of $H_2O_2$ so-formed is determined. Since 1 mole of $H_2O_2$ is produced per mole of anthrahydroquinone, the concentration of anthraquinones can be readily calculated from the amount of hydrogen peroxide produced in the test.

The invention is illustrated by the following examples.

*Example 1*

A working solution, in which the working solvent was a mixture of α-methylnaphthalene and diisobutylcarbinol, contained dissolved solids equal to 15.36% of the weight of the solution and had an effective anthraquinone concentration of 9.4% (3.1% 2-t-butylanthraquinone and 6.3% 2-t-butyltetrahydroanthraquinone). The solution had become degraded to a substantial extent through use in cyclic reduction-oxidation operations to produce hydrogen peroxide. The difference (5.96%) between the concentration of total solids and the effective anthraquinone concentration represented the concentration of inert anthraquinone degradation products present as a result of such use of the solution.

The above degraded solution was mixed with 1 part by volume of methanol and 1 part by volume of glacial acetic acid. After replacing the air in the container with nitrogen, there was added to the resulting solution an amount of 20 mesh zinc equal to 13.3 gram atoms of zinc per mole of solids (anthraquinone and inert degradation products thereof) present in the working solution being treated, all such solids being calculated as 2-t-butylanthraquinone. The solution was stirred during addition of the zinc and for the next 15 hours at about room temperature, during which time 1.2 gram atoms of zinc were consumed per mole of said solids. After separating the unconsumed zinc, the solution was oxidized with air to convert anthrahydroquinones back to anthraquinones, and the methanol and acetic acid were removed by extraction with water. The effective anthraquinone concentration of the working solution so-treated was 12.4%, compared with only 9.4% for the untreated solution. Recovery of working solution was 95%. These results show that a substantial amount of the inert anthraquinone degradation products present in the starting degraded working solution were reconverted by the zinc-acid reduction treatment to effective anthraquinones.

*Example 2*

The procedure of Example 1 was repeated except that magnesium turnings in an amount corresponding to 1.9 gram atoms of the metal per mole of solids were used in place of zinc, and the volume proportions of working solution:methanol:acetic acid were 1:0.35:0.25. In this case, 1.8 grams atoms of the metal were consumed per mole of solids present and the effective anthraquinone concentration of the treated solution was 12.3% compared with 9.4% for the untreated solution. Recovery of working solution was 94%.

*Example 3*

The general procedure of the above examples was repeated using magnesium turnings equivalent to 2 gram atoms of the metal per mole of solids present and the volume proportions of working solution:methanol:acetic acid were 1:0.2:0.4. In this instance, all of the metal was consumed in 5 hours, when the treatment was terminated. The effective anthraquinone concentration of the treated working solution was 11.5% compared with 9.4% for the untreated solution.

In addition to reconverting inert anthraquinone degradation products to effective anthraquinones, the present metal-acid treatment also effects reduction of the anthraquinones to the anthrahydroquinones. Experience in regenerating degraded working solutions by the present method indicates that worthwhile regeneration requires consumption of an amount of the reducing metal equal to at least one gram atom of the metal per mole of anthraquinone and anthraquinone degradation products (all calculated as the anthraquinone) present. When zinc is used, it is decidedly beneficial to employ a considerable excess of the metal. Thus, best results are obtained using from about 5 to 20 gram atoms of zinc per mole of the anthraquinone and anthraquinone degradation products. However, most of the excess of zinc, when used, will remain practically unconsumed and can readily be recovered for further use. With magnesium, large excesses generally do not increase effectiveness of the treatment and such excesses of the metal are usually wastefully consumed. From about 1 to 3 gram atoms of magnesium per mole of anthraquinone and anthraquinone degradation products are generally preferred.

Any solvent can be employed which dissolves the anthraquinone degradation products to be treated, is miscible with the acid to be used, and is also inert to the reactants and the reaction products under the conditions employed. A polar solvent is preferably used, examples of which are dioxane, ether, acetone and the lower aliphatic alcohols such as ethanol and methanol. The most preferred solvent is methanol.

The preferred acid is acetic acid, but other acids such as formic acid and sulfuric acid, which together with the metal will reduce the anthraquinone intermediate to the anthrahydroquinone, are also operable. However, results obtained with formic and sulfuric acids have generally been inferior to those obtained with acetic acid. The amount of acid used should be at least stoichiometrically equal to the amounts of anthraquinone and degradation products thereof in the solution, i.e., at least 2 equivalents of acid per mole of anthraquinone and anthraquinone degradation products. Preferably, from 1.5 to 30 times the stoichiometric amount will be employed, but even larger amounts can be used.

The regeneration treatment is conveniently carried out at about room temperature, although there generally will be some temperature increase during the early stages of the reaction. Higher temperatures, even up to the boiling temperature of the mixture, can be used but temperatures higher than about 60° C. are not recommended.

The method is applicable to degraded working solutions generally and to degraded anthraquinone products which have been removed from the working solution or may be contained in catalyst washings or similar solutions. When applied to degraded working solution, the entire working solution of a process can be periodically treated by the present method to increase its peroxide synthesizing capacity. Alternatively, a side stream of the working solution can be so treated and then returned to the recycle stream, thereby maintaining the peroxide synthesizing capacity of the recycle stream at a level higher than it would be were the treatment omitted.

I claim:

1. The method comprising subjecting a solution of anthraquinone degradation products to the reducing action of a metal and an acid, said metal being from the group consisting of zinc and magnesium, and said acid being one which is miscible with said solution and which together with said metal will reduce the anthraquinone from which said degradation products were derived to the anthrahydroquinone, said anthraquinone degradation products having been formed in a cyclic reduction-oxidation process for producing hydrogen peroxide employing an anthraquinone working intermediate.

2. A method of regenerating a degraded solution comprising a solution of an anthraquinone and degradation products thereof which have been formed through use of said anthraquinone as a working intermediate in a cyclic reduction-oxidation process for producing hydrogen peroxide, said method comprising subjecting said solution to the reducing action of a metal and an acid, said metal being from the group consisting of zinc and magnesium, and said acid being one which is miscible with said solution and which together with said metal will reduce said anthraquinone to the anthrahydroquinone.

3. A method of regenerating a degraded working solution from a cyclic anthraquinone reduction-oxidation process for producing hydrogen peroxide, comprising subjecting said degraded working solution to the reducing action of a metal and an acid, said metal being from the group consisting of zinc and magnesium, and said acid being one which is miscible with said solution and which together with said metal reduces the anthraquinone working intermediate to the anthrahydroquinone, said acid further being from the group consisting of acetic acid, formic acid and sulfuric acid.

4. The method of claim 3 employing zinc and acetic acid.

5. The method of claim 4 employing 5 to 20 gram atoms of zinc per mole of anthraquinone and anthraquinone degradation products (calculated as anthraquinone) present in the degraded solution and 1.5 to 30 times the stoichiometric amount of acetic acid, based upon the amount of said anthraquinone and anthraquinone degradation products present.

6. The method of claim 3 employing magnesium and acetic acid.

7. The method of claim 6 employing 1 to 3 gram atoms of magnesium per mole of anthraquinone and anthraquinone degradation products (calculated as anthraquinone) present in the degraded solution and 1.5 to 30 times the stoichiometric amount of acetic acid, based upon the amount of said anthraquinone and anthraquinone degradation products present.

8. The method of claim 1 wherein the anthraquinone degradation products were formed in a cyclic reduction-oxidation process for producing hydrogen peroxide employing 2-t-butylanthraquinone as a working intermediate.

9. The method of claim 3 wherein the degraded working solution is from a cyclic anthraquinone reduction-oxidation process for producing hydrogen peroxide employing 2-t-butylanthraquinone as a working intermediate.

10. The method of claim 3 wherein the degraded working solution is from a cyclic anthraquinone reduction-oxidation process for producing hydrogen peroxide employing a mixture of 2-t-butylanthraquinone and 2-t-butyltetrahydroanthraquinone as the working intermediate.

11. The method of claim 10 employing zinc and acetic acid.

12. The method of claim 10 employing magnesium and acetic acid.

References Cited in the file of this patent

UNITED STATES PATENTS

| 1,735,763 | Jaeger | Nov. 12, 1929 |
| 2,739,875 | Sprauer et al. | Mar. 27, 1956 |

OTHER REFERENCES

Wagner et al.: Synthetic Organic Chemistry, 2d edition (1953), pp. 154–155 relied on.